United States Patent [19]

Abraham et al.

[11] Patent Number: 5,263,776
[45] Date of Patent: Nov. 23, 1993

[54] MULTI-WAVELENGTH OPTICAL THERMOMETRY

[75] Inventors: David W. Abraham, Ossining; William M. Holber, New York; Joseph S. Logan, Poughkeepsie; Hemantha K. Wickramasinghe, Chappaqua, all of N.Y.

[73] Assignee: International Business Machines Corporation, Armonk, N.Y.

[21] Appl. No.: 951,280

[22] Filed: Sep. 25, 1992

[51] Int. Cl.⁵ ............ G01K 11/00; G01J 3/427; G01J 3/45

[52] U.S. Cl. .................. 374/161; 374/120; 356/45; 356/346; 356/360

[58] Field of Search .......... 374/161, 127, 120; 356/35.5, 45, 346, 360

[56] References Cited

U.S. PATENT DOCUMENTS

| | | | |
|---|---|---|---|
| 3,790,284 | 2/1974 | Baldwin | 356/360 |
| 4,057,349 | 11/1977 | Barrett | 356/346 |
| 4,081,215 | 3/1978 | Penney et al. | 356/45 |
| 4,136,566 | 1/1979 | Christensen | 73/356 |
| 4,376,890 | 3/1983 | Engstrom et al. | 250/227 |
| 4,437,761 | 3/1984 | Kroger et al. | 374/161 |
| 4,522,510 | 6/1985 | Rosencwaig et al. | 374/7 |
| 4,523,092 | 6/1985 | Nelson | 250/227 |
| 4,579,463 | 4/1986 | Rosencwaig et al. | 374/57 |
| 4,673,299 | 6/1987 | Dakin | 374/161 |
| 4,729,668 | 3/1988 | Angel et al. | 374/161 |
| 4,740,078 | 4/1988 | Daendliker et al. | 356/35.5 |
| 4,767,219 | 8/1988 | Bibby | 374/123 |
| 4,790,669 | 12/1988 | Christensen | 374/131 |
| 4,848,908 | 7/1989 | Huang | 356/360 |
| 4,859,065 | 8/1989 | Bibby | 356/45 |
| 4,928,005 | 5/1990 | Lefevre et al. | 356/346 |
| 4,939,368 | 7/1990 | Brown | 356/35.5 |
| 4,979,133 | 12/1990 | Arima et al. | 364/557 |
| 5,146,293 | 9/1992 | Mercer et al. | 356/360 |
| 5,153,669 | 10/1992 | DeGroot | 356/360 |

FOREIGN PATENT DOCUMENTS

| | | | |
|---|---|---|---|
| 0014729 | 1/1982 | Japan | 374/161 |
| 0225627 | 10/1986 | Japan | 374/161 |
| 0205531 | 8/1988 | Japan | 374/161 |

OTHER PUBLICATIONS

"Wavelength Modulated Interferometric Thermometry For Measurement of Non-Monotonic Temperature Change", IBM Technical Disclosure Bulletin, vol. 34, No. 5, Oct. 1991, pp. 350-353.

"Thickness Measurements Using IR Tunable Laser Source", IBM Technical Disclosure Bulletin vol. 35, No. 1B Jun. 1992, pp. 465-468.

C. C. Williams et al, "Optical ranging by wavelength multiplexed interferometry", J. Appl. Phys. 60 (6), 15 Sep. 1986, pp. 1900-1903.

C. C. Williams et al, "Absolute optical ranging with 200-nm resolution", Optics Letters, vol. 14, No. 11, Jun. 1, 1989, pp. 542-544.

"Nonintrusive Thermometry For Transparent Thin Films By Laser Interferometric Measurement of Thermal Expansion (Limotex) Using Single or Dual Beams", IBM Technical Disclosure Bulletin, vol. 30, No. 1 Jun. 1987 pp. 239-243.

K. L. Saenger et al "Wavelength Modulated Interferometric Thermometry for Improved Substrate Temperature Measurement", IBM Research Report 17168 (#76101) Sep. 6, 1991.

M. Luckiesh, "An Interference Thermometer and Dilatometer Combined", J. Franklin Inst. 194, p. 251 (1922).

F. C. Nix et al, "An Interferometric-Dilatometer with Photographic Recording", R.S.I. vol. 12, Feb. 1941, pp. 66-70.

*Primary Examiner*—William A. Cuchlinski, Jr.
*Assistant Examiner*—Digeo F. F. Gutierrez
*Attorney, Agent, or Firm*—Philip J. Feig

[57] ABSTRACT

Multi-wavelength optical thermometry provides for non-contact measurement of the temperature of a sample where the front surface and the back surface of the sample are used in a interferometer to measure changes in optical path length. Laser beams at two different wavelengths are used and the beam phase of the two resultant interference signals is used to unambiguously measure the path length change over a broad temperature range.

10 Claims, 1 Drawing Sheet

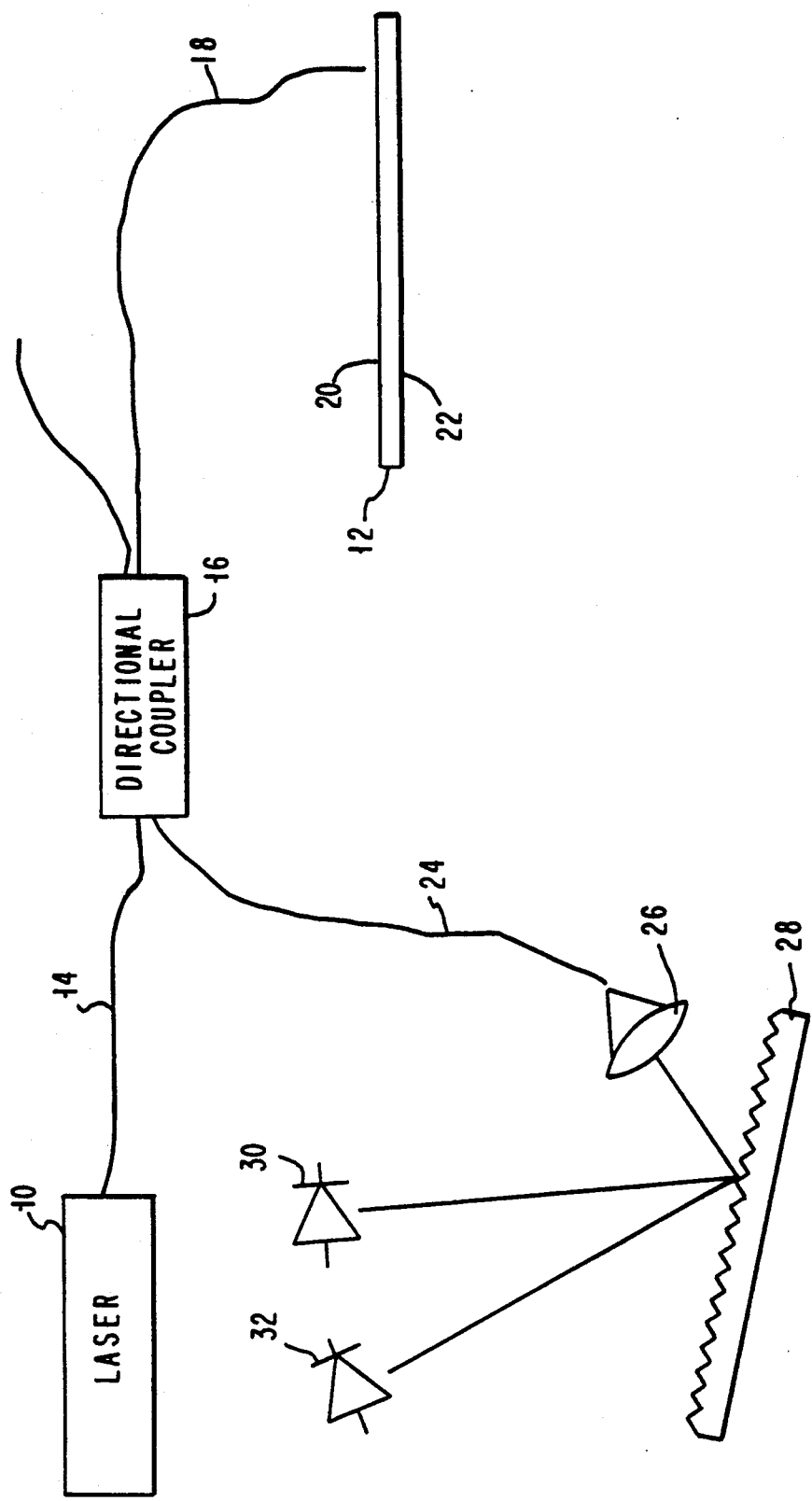

MULTI-WAVELENGTH OPTICAL THERMOMETRY

BACKGROUND OF THE INVENTION

The present invention relates to multi-wavelength optical thermometry. Specifically, a non-contact temperature measurement is performed where the front and back surfaces of a workpiece, such as a semiconductor wafer, is used in an interferometric arrangement in order to measure changes in optical path lengths. Quite specifically, two laser beams, each having a different wavelength of light, are used for providing optical beams useful for measuring the temperature of a semiconductor wafer.

Measurement and control of the temperature of a substrate or wafer during many semiconductor manufacturing processes can greatly enhance yield. Preferably, non-contact methods are employed to avoid contamination during measurement and the problems associated with thermal contact. Also, the electronics used with the measurement instrument can be located remote from the vicinity where the manufacturing process is being performed.

Non-contact optical thermometry permits absolute determination of arbitrarily varying temperatures, opening up important applications, such as temperature control, when the temperature can be expected to vary from a set point.

Substrate temperature is widely recognized as an important processing parameter in the fabrication of a wide variety of thin film materials and devices, particularly in the microelectronics industry. Optical thermometry utilizes laser interferometry to determine temperature changes from the thermal expansion and refractive index changes of a transparent substrate whose front and back faces are polished and approximately parallel. Such techniques have been used to measure temperature of optically absorbing semiconducting materials, such as silicon and gallium arsenide, using IR lasers at wavelengths of 1.15 μm, 1.5 μm or 3.39 μm.

The concept of optical temperature probes is well known in the art as evidenced by the articles entitled "An Interference Thermometer and Dilatometer Combined" by M. Luckiesh et al, J. Franklin Inst. 194, 251 (1922) and "An Interferometric-Dilatometer with Photographic Recording" by F. C. Nix and D. MacNair, Rev. Sci. Instru., Feb. 12, 1941, pp. 66–70.

More recently, in articles entitled "Wavelength Modulated Interferometric Thermometry for Measurement of Non-Monotonic Temperature Change", IBM Technical Disclosure Bulletin, 34, Oct. 5, 1991, pp 350–353 and "Thickness Measurements Using IR Tunable Laser Source", IBM Technical Disclosure Bulletin, 35, 1B, June 1992, pp 465–468, there are disclosed a laser based arrangement for temperature measurement in which infrared laser radiation illuminates a silicon wafer and is reflected from both the front and back surfaces of the silicon workpiece. The workpiece is transparent because of the semiconductor band gap, has a dielectric constant of approximately 12 and is quite temperature dependent. As the workpiece temperature changes, the path length through the workpiece changes primarily from a shift in the dielectric constant. The resulting interference signal formed in the cavity between the two silicon workpiece surfaces also changes. In the arrangements described in the above articles, the laser frequency dithers slightly to provide a derivative signal indicating whether the temperature is increasing or decreasing. The temperature is then calculated by fringe counting at a rate, for silicon, of 7° C. per fringe.

The complexity of counting fringes over a process temperature range in the order of hundreds of degrees will be evident to those skilled in the art. Moreover, errors result if the rate of change of the temperature is greater than the rate at which the measurement scheme can count the fringes. If the temperature could be measured using a single fringe over the entire temperature range, the ambiguity resulting from fringe counting could be eliminated.

SUMMARY OF THE INVENTION

The present invention overcomes the limitations of the described arrangements by simultaneously using two wavelengths of laser light to make two independent measurements of the path length difference between the front surface and the back surface of the workpiece. Using known wavelengths, either of the two measurements provide a measure of the temperature changes ΔT corresponding to one fringe or less.

The present invention is most beneficial in semiconductor processing or manufacturing, or in-situ monitoring of process temperatures and temperature changes. The invention also has application for in-situ temperature measurement during rework where reworking of a single chip causes heating of an entire substrate containing many such chips.

In order to obtain a temperature change over a large temperature range, the phase of the interference signals at each wavelength is measured and the difference of the measured phases is calculated. The combined phase corresponds to a beat wavelength $$\lambda_{eff} = \frac{\lambda_1 \lambda_2}{\lambda_2 - \lambda_1},$$

where $\lambda_1$ is the wavelength of the first laser beam and $\lambda_2$ is the wavelength of the second laser beam.

For a one percent difference of wavelengths centered at 1.5 μm, the beat interference repeats every 75 μm, or approximately 700° C. Within the interval, the optical path length difference within the workpiece, and hence the temperature, is uniquely determined.

In order to generate laser light at different wavelengths preferably two solid state single mode infrared lasers operating at wavelengths of approximately 1.3 μm or at wavelengths of approximately 1.55 μm are used.

The use of two laser beams at different wavelengths for optical ranging applications are known in the art and is described in the articles entitled "Optical Ranging by Wavelength Multiplexed Interferometry" by C. C. Williams et al, J. Appl. Phys. 60(b) Sep. 15, 1986, pp 1900–1903 and "Absolute Optical Ranging with 200-nm Resolution" by C. C. Williams et al, Optics Letters, 14(11), Jun. 1, 1989, pp. 542–544.

A primary advantage of the present invention is that minimal post-processing of signals is required to obtain a measurement of the temperature. After performing an initial calibration of the apparatus in order to obtain an initial beat phase, subsequent temperature measurement is not dependent on any subsequent fringe counting, providing the temperature excursion allows the beat phase to remain within a single fringe.

A principal object of the present invention is therefore, the provision of an optical temperature sensor employing a two-color laser source.

Another object of the invention is the provision of a multiwavelength optical thermometer for use in monitoring semiconductor processes.

Further and still other objects of the invention will become more clearly apparent when the following description is read in conjunction with the accompanying drawings.

BRIEF DESCRIPTION OF THE DRAWING

The sole FIGURE is a schematic representation of a preferred embodiment of the present invention.

DETAILED DESCRIPTION

Referring now to the FIGURE, there is shown schematically a preferred embodiment of the present invention. A laser source 10 emits two laser beams of different wavelengths $\lambda_1$ and $\lambda_2$. In a preferred embodiment the laser source 10 comprises two solid state single mode infrared lasers. The wavelengths are selected so that the sample 12 is transparent to the laser beam and characterized by a dielectric constant. The difference in wavelengths $(\lambda_2 - \lambda_1)$ is selected to be an amount which results in a single fringe corresponding to the range of temperatures to be measured. In the case of a silicon wafer sample, the wavelengths are selected to be in the vicinity of 1.55 µm, and preferably the difference in wavelengths $\lambda_2 - \lambda_1$ is approximately one percent or on the order of 0.015 µm.

In order to better understand the invention, the operation will be described in terms of a single channel interferometer, i.e., the signal due to only one laser beam of wavelength $\lambda_1$.

Light from the laser source 10 is transmitted into one end of an optical fiber 14, travels through directional coupler 16 and is transmitted from the end of fiber 18 directly at the entrant or front surface 20 of the sample 12. The end of fiber 18 is polished at an angle of approximately 7° or 8° from a plane normal to the longitudinal axis of the fiber so that back reflections from the end of the fiber 18 are eliminated. A portion of the transmitted light beam is reflected from surface 20 back into the fiber 18 and a portion of the light beam continues through the sample 12 to the back surface 22 whereat the light reflects back through the sample 12 and into the fiber 18. The two reflected light beams, i.e. reflections from the surface 20 and surface 22 of the sample 12, travel back through the fiber 18, through directional coupler 16 and thence to a photodetector, such as a photodiode detector.

The difference in path lengths of the light reflected from the two surfaces of the sample, equal to twice the thickness of the sample, results in an intensity which varies as the sin $\phi$, where $\phi$ is 2 knt, k is a wavenumber equal to $$\frac{2\pi}{\lambda_1},$$

n is the index of refraction of the transparent sample at the wavelength $\lambda_1$, and t is the sample thickness. In the case of a silicon wafer sample, the index of refraction is temperature dependent and the change of intensity can be related to temperature. The relationship applies to any sample where the index of refraction is temperature dependent.

When only a single frequency laser beam is used as described above, various methods have been employed to measure the sample temperature over a range of several hundreds of degrees, a typical range for common wafer processing steps. The fundamental problem with such methods resides in the fact that a complete sinusoidal period at the photodetector corresponds to only a limited portion of the desired measuring temperature range. For an unambiguous measurement of the sample temperature it is most desirable to increase the temperature range corresponding to a single fringe, that is a single sinusoidal period. In accordance with the teachings of the present invention, this is accomplished by using two laser beams of closely spaced laser frequencies.

Referring again to the figure, laser source 10 transmits two laser beams at different wavelengths $\lambda_1$ and $\lambda_2$, into fiber 14, through directional coupler 16 into fiber 18 and at the sample 12. Light is reflected by each beam from front surface 20 and back surface 22, as described above, into fiber 18, through directional coupler 16 and into fiber 24. The reflected light beams are passed through lens 26 onto an optical grating 28 or similar device which separates the interfering beams at wavelength $\lambda_1$ to a photodetector 30 and the beam at wavelength $\lambda_2$ to a photodetector 32.

The output signal at detector 30 varies as the sine of the optical phase as described above. The phase can be determined by monitoring the output signal over a small temperature range or by dithering the wavelength by an amount sufficient to provide a nearly full fringe change in the interference pattern. After calibrating the device in the above described manner, both optical phases may be determined by the equations $$\phi_1 = \frac{4\pi n t}{\lambda_1} \text{ and } \phi_2 = \frac{4\pi n t}{\lambda_2}.$$

The phase difference $\Delta\phi$ is equal to $$\frac{4\pi n t}{\lambda_{eff}} \text{ where } \lambda_{eff} = \frac{\lambda_1 \lambda_2}{\lambda_2 - \lambda_1}.$$

Selecting the difference of the wavelengths $(\lambda_2 - \lambda_1)$ to be, for example, one percent, i.e. $\lambda_2 = 1.565$ µm and $\lambda_1 = 1.55$ µm, results in a beat or effective wavelength of 162 µm. An effective wavelength of 162 µm permits continuous temperature measurement over a temperature range of 700 degrees without any ambiguity.

In an alternative embodiment the laser source 10 is selected so that the wavelength $\lambda_2$ is 1.313 and the wavelength $\lambda_1$ is 1.30 when the laser beam wavelengths are approximately 1.3 µm.

The two output signals from the photodetectors 30, 32 are processed by any of a number of known methods to obtain the phase difference between the two output signals. In order to extract phase information from a measurement of intensity versus path length or temperature, a minimum of three data points must be obtained. This can be done most simply by extending the techniques described in the two IBM Technical Disclosure Bulletins, supra. In these articles the intensity was tracked as a function of temperature, and fringe counting was employed to extend the temperature range. In accordance with the present invention, a preferred method is to track the intensity over a single fringe or over a sufficiently large amplitude to obtain a signal which can be readily processed and to use the two color laser beam method to provide data over a broad temperature range. Such a method requires only a limited knowledge of the temperature history (i.e. the last few degrees of temperature excursion) in order to unambiguously measure the temperature.

An alternative method is to measure the three data points of intensity as a function of wavelength by varying the wavelength of both laser beams at a frequency $\omega$, and then measuring the intensity by the variation in intensity at the frequency $\omega$ and at the frequency $2\omega$. The wavelength variation can be small, typically below 1 Å change in wavelength, and can be produced by a variation in laser bias current. The three measured data points are the laser diode power output, and locking amplifier measurements of the two frequency components. These three measurements suffice to determine the phase of the interference as a function of wavelength. This measurement must be done independently for each of the two color (wavelengths) laser beams and then numerically the phase difference can be determined to provide an extended temperature measurement range as discussed above.

While there has been described and illustrated a preferred embodiment of multi-wavelength optical thermometry, it will be apparent to those skilled in the art that variations and modifications are possible without deviating from the broad scope of the invention which shall be limited solely by the scope of the claims appended hereto.

What is claimed is:

1. A method of optically measuring the temperature of a sample having a front surface and a back surface comprising the steps of:

transmitting a first laser beam having a wavelength $\lambda_1$ and a second laser beam having a wavelength $\lambda_2$, where the sample is transparent at the wavelengths $\lambda_1$ and $\lambda_2$;

receiving laser beams reflected from the front surface and the back surface;

separating the reflected beams for generating a first interferometric phase output signal responsive to the reflected beams having a wavelength $\lambda_1$ and a second interferometric phase output signal responsive to the reflected beams having a wavelength $\lambda_2$; and measuring the temperature of the sample responsive to the phase difference between said first interferometric phase output signal and said second interferometric phase output signal.

2. A method of optically measuring the temperature of a sample as set forth in claim 1, wherein the wavelengths differ ($\lambda_2 - \lambda_1$) by an amount which results in a single fringe corresponding to the range of temperatures to be measured.

3. A method of optically measuring the temperature of a sample as set forth in claim 1, wherein said sample is a semiconductor wafer.

4. A method of optically measuring the temperature of a sample as set forth in claim 3, wherein said sample comprises silicon and the wavelengths $\lambda_1$ and $\lambda_2$ are approximately 1.5 $\mu$m.

5. A method of optically measuring the temperature of a sample as set forth in claim 3, wherein said sample comprises silicon and the wavelengths $\lambda_1$ and $\lambda_2$ are approximately 1.3 $\mu$m.

6. A multi-wavelength optical thermometer comprising:

laser means for emitting a first laser beam having a wavelength $\lambda_1$ and a second laser beam having a wavelength $\lambda_2$ at a sample having a front surface and a back surface, where $\lambda_1$ and $\lambda_2$ are selected so that the sample to be measured is transparent at the wavelength $\lambda_1$ and $\lambda_2$;

means for receiving laser beams reflected from the front surface and the back surface;

means for separating said reflected beams for generating a first interferometric phase signal responsive to the reflected beams having a wavelength $\lambda_1$ and a second interferometric phase signal responsive to the reflected beams having a wavelength $\lambda_2$, and means for determining the phase difference between said first interferometric phase signal and said second interferometric phase signal indicative of the temperature of the sample.

7. A multi-wavelength optical thermometer as set forth in claim 6, wherein the wavelengths differ ($\lambda_2 - \lambda_1$) by an amount which results in a single fringe corresponding to the range of temperatures to be measured.

8. A multi-wavelength optical thermometer as set forth in claim 6, wherein said sample is a semiconductor wafer.

9. A multi-wavelength optical thermometer as set forth in claim 8, wherein said semiconductor wafer comprises silicon and the wavelengths $\lambda_1$ and $\lambda_2$ are approximately 1.5 $\mu$m.

10. A multi-wavelength optical thermometer as set forth in claim 8, wherein said semiconductor wafer comprises silicon and the wavelengths $\lambda_1$ and $\lambda_2$ are approximately 1.3 $\mu$m.

* * * * *